United States Patent [19]

Barben

[11] Patent Number: 4,750,776
[45] Date of Patent: Jun. 14, 1988

[54] BED LINER AND MOUNTING DEVICE

[75] Inventor: Jack Barben, Union, Mich.

[73] Assignee: Custom Form Manufacturing Co., Inc., Elkhart, Ind.

[21] Appl. No.: 932,327

[22] Filed: Nov. 19, 1986

[51] Int. Cl.⁴ .............................................. B60D 33/02
[52] U.S. Cl. .................................................. 296/39 R
[58] Field of Search ............. 224/42.42 R; 296/39 R, 296/184; 52/573, 169.5, DIG. 5

[56] References Cited

U.S. PATENT DOCUMENTS

| | | | |
|---|---|---|---|
| 2,967,557 | 1/1961 | Tait et al. | 411/349 |
| 3,462,187 | 8/1969 | Hassler | 296/184 |
| 3,578,375 | 5/1971 | Finefrock | 296/184 |
| 3,898,778 | 8/1975 | Erickson et al. | 52/169.5 |
| 4,007,516 | 2/1977 | Coules | 411/349 |
| 4,125,077 | 11/1978 | Baaso | 410/82 |
| 4,323,279 | 4/1982 | Domes et al. | 296/184 |
| 4,333,678 | 6/1982 | Munoz et al. | 296/39 R |
| 4,575,146 | 3/1986 | Markos | 296/39 R |
| 4,595,229 | 6/1986 | Wagner | 296/39 R |
| 4,623,187 | 11/1986 | Ibrahim | 296/39 R |
| 4,659,133 | 4/1987 | Gower | 296/39 R |

Primary Examiner—Johnny D. Cherry
Assistant Examiner—Carol L. Olson
Attorney, Agent, or Firm—Barnes & Thornburg

[57] ABSTRACT

A unitary liner for truck beds including a flange for positioning the side wall of the liner relative to the side wall of the truck such that the bottom of the liner side wall and adjacent portions of the bottom side walls are displaced from the bed bottom wall. The bottom wall of the liner includes raised ribbed portion displaced from the side and front walls to create peripheral drains and the bottom wall is inclined relative to the side, front and bottom walls of the liner at the corners of the side and front walls to prevent water and other foreign material from collecting at the corners. A mounting device is provided which is secured to the side rail of the bed through a slot provided in the side wall of the liner to permit horizontal and vertically downward movement of the liner and prevent vertically upward movement of the liner.

19 Claims, 4 Drawing Sheets

BED LINER AND MOUNTING DEVICE

BACKGROUND AND SUMMARY OF THE INVENTION

The present invention relates generally to bed liners for the beds of pickup trucks, and more specifically to an improved bed liner, floor ribbed pattern and mounting device.

There has been a growing trend to use unitary liners in the beds of pickup trucks. These liners are of various designs of rib patterns and dimensional shape and have included various mounting devices.

To prevent moisture and foreign material from collecting between the liner and the bed of the truck, the primary bed liners have been dimensioned and structured so as to provide a tight fit between the bottom of the liner and the bottom of the bed. Since the side wall of the truck generally includes an inwardly extending rail, the side wall of the liner is offset from the side wall of the truck. Thus, the height of the side wall of the liner has been made to be equal to or greater than the height of the rail relative to the bed of the truck. This allows the side wall to bow into the space below the rail if the height of the rail is shorter than the height of the side wall.

The installation process generally includes positioning the liner within the bed and securing or mounting the liner to the side walls of the bed by fasteners which limit movement therebetween. With use and temperature changes, the liner expands and contracts changing the bow of the side wall of the liner. If the liner is already bowed because of a misfit, the continued bowing in warm weather may not be accommodated and cause undesirable stress throughout the liner side walls. The stress will be concentrated at the fastener and thereby creates cracking or tearing of the side wall at the fastener. Similarly, longitudinal stress is produced in the liner upon loading and unloading heavy objects. This provides additional stress concentrated at the fastener. Prior art fasteners have not accommodated this stress concentration and therefore the liners have generally cracked or ripped at the fastener.

The ribbing on the bottom of the liner has generally provided areas of localizing accumulation of water and foreign material. These generally occur at the corner defined by the intersection of the front and side walls. Similarly, the ribbed pattern extends into the side and front walls and especially the wheel well walls. This prevents appropriate draining from the front to the back of the liner.

The free standing liners are individually nested or stacked one upon the other for shipment. Prior art design of the liners allows the side walls to flare increasingly outward from the front wall when the liners are in a free-standing condition. This flaring produces the undesirable effect of reducing the quantity of liners that may be nested within the limited width of the hauling means and further produces an outward distortion of the side walls of the liners arranged on the bottom of the nest from the stresses applied along the area of interesection of the side and floor walls resulting from the weight of the liners nested above.

Thus it is an object of the present invention to provide an improved liner which will accommodate fluctuations of the liner with change of temperature and loading.

Another object of the present invention is to provide a securing device for the liner which allows for reduction and distribution of stress.

A still further object of the present invention is to provide a mounting device for liners which allows for longitudinal adjustment.

A still even further object of the present invention is to provide a rib pattern in the floor of a liner which prevents accumulation of moisture and foreign material in the liner.

A still even further objective of the present invention is to provide a vertical rib pattern on the liner side walls allowing for increased nesting capabilities.

These and other objects are attained by providing a positioning element which positions the liner side wall relative to the bed side wall so that the bottom of the liner side wall and adjacent portions of the liner bottom wall are displaced from the bed bottom wall. This will allow the bottom wall and the side wall to deflect downward under loads and changes of temperature. It also allows positioning of the side walls prior to mounting to assure a perfect fit. The positioning element may be a flange extending outwardly from the top of the liner side walls for engaging the top of the bed side wall rail extending inwardly therefrom. The height of the liner side wall may be equal to or less than the height of the bed side wall. The liner flange forms an acute angle with the liner side wall to produce the appropriate positioning to assure that the bottom of the liner side wall and adjacent portion of the liner bottom wall are displaced from the bed bottom wall. A lip may extend downwardly from the liner flange and engage the top of the rail of the bed side wall.

To prevent accumulation of foreign material and moisture in the liner, the bottom wall includes an inclined portion inclined with respect to the liner side, front and bottom walls at the corner defined by the side and front walls. The bottom wall also includes a plurality of spaced raised ribs spaced from the side walls to form a peripheral drain adjacent the front and side walls. They are also displaced from the wheel wells to form a drain therebetween. The ribs are divided into two groups of parallel ribs extending at opposite acute angles with respect to the longitudinal axis of the liner bottom wall and are separated from each other by a longitudinal center line to form a center drain. A raised transverse rib extends between the liner side walls adjacent the back of the liner and spaced from the plurality of ribs to form a drain therebetween. An opening in the transverse rib at the longitudinal center axis of the liner bottom wall defines an outlet for the drains.

To increase the nesting capabilities of the free-standing liners, the height of the wall ribs at the area forward of the wheel well portions are reduced with respect to the wall ribs rearward providing increased rigidity at the side walls decreasing the amount of the rearward flaring of the side walls when the liner is free-standing. Further, the opening provided in the transverse rib allows the rearward floor wall to collapse into a "V" shape at the opening when the liner is free-standing further allowing the side walls to assume an approximately parallel alignment. This then allows the nesting of an increased quantity of the liners within the limited width of the hauling means and also decreases the distorting stresses applied at area of intersection of the side and floor walls.

In an especially preferred embodiment of the invention a mounting device for mounting a liner side wall to a truck bed having an inwardly and downwardly extending side rail includes a handle member having a blocking device extending from the handle member and having a washer extending from the blocking device and a fastener. The blocking device is formed with rounded edges allowing rotation of the blocking device within the slot provided through the liner side wall. The blocking device is inserted through the slot with the washer disposed against the side rail. The fastener is received through the blocking device and washer extending through the side rail. The blocking device is disposed against the bottom of the slot which allows horizontal and vertically downward movement and prevents vertically upward movement of the liner side wall.

In a certain preferred embodiment of the invention, a mounting device includes a handle member having a blocking device extending from the handle member and a fastener. A slot is provided through the liner wall. The width and height of the blocking device is less than the width and height of the slot. The blocking device is inserted through the slot and is disposed against the rail and the fastener is received through the blocking device extending through the rail. The blocking device is also disposed against the bottom of the slot which allows horizontal and vertically downward movement and prevents vertical upward movement of the side wall liner.

In another certain preferred embodiment of the invention a mounting device includes a handle member having a blocking device extending from the handle member, a swiveling device including a base having parallelly aligned prongs extending perpendicular to the base and mounting legs. The mounting legs are of one equal length and arranged inside the downwardly extending portion of the rail. The ends of the mounting legs are chamfered and slidably receive the prongs therebetween. A slot is provided through the liner side wall through which the blocking device is inserted and disposed against the rail. The width and height of the blocking device is less than the width and height of the slot. A fastener is threadably received through the handle and blocking device extending through a bore provided in the base. The fastener is received in the gap between the prongs, which gap is less in height than the inside diameter of the bore forcing the prongs to engage and grip the chamfered ends of the mounting legs. A tightening of the fastener allows the mounting legs to rotate until the longer leg engages the top of the rail securing the disposition of the blocking device against the bottom of the slot and thereby permitting horizontal and vertically downward movement and preventing vertically upward movement of the liner side wall.

Other objects, advantages and novel features of the present invention will become apparent from the following detailed description of the invention when considered in conjunction with the accompanying drawings.

DETAILED DESCRIPTION OF THE DRAWINGS

As illustrated in the figures, a unitary liner 10 is shown having a bottom wall 12 with upwardly extending side walls 14 and 16 and front wall 18. A flange 20 extends outwardly from the top of the side and front walls. The liner includes wheel well portions 22. A non-unitary liner or guard 24 is provided on the tailgate.

Figure 4:
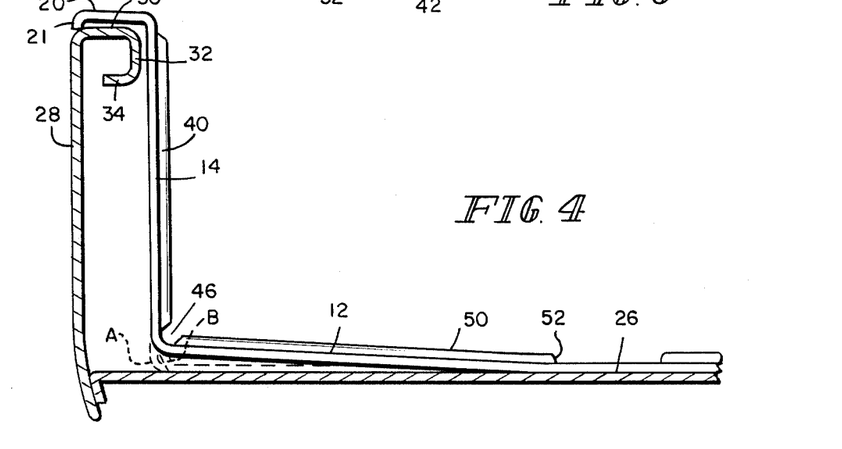
FIG. 4 is an end view of FIG. 3 including the truck with the side wall end panel cutaway.
Figure 5:
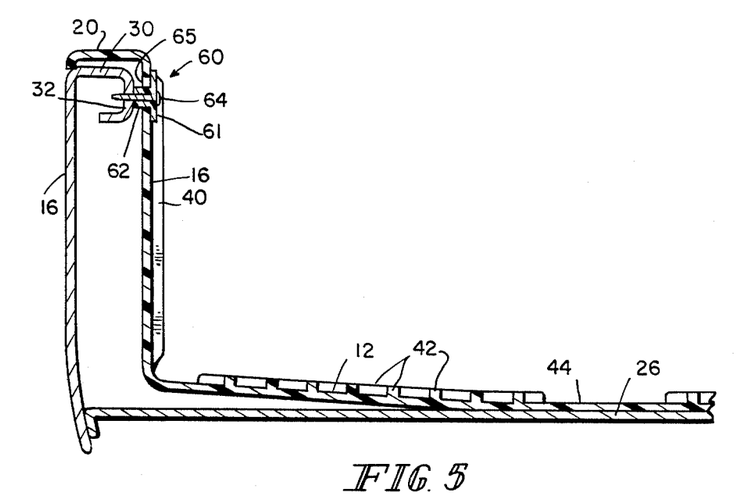
FIG. 5 is a cross-sectional view taken along lines V—V of FIG. 3 including the truck which shows a mounting device according to the principles of the present invention.

As illustrated specifically in FIGS. 4 and 5, the bottom wall 12 of the liner lies on the bottom wall 26 of the bed of the pickup truck. Side wall 28 extends up from the bottom wall 26 of the pickup truck and includes a top rail having an inwardly extended portion 30, a downwardly extended portion 32 and an outwardly extended portion 34. When the liner 10 is positioned in the bed of the pickup truck, the flange 20 extends over the top rail portion 30 and engages the rail portion 30 at a lip 21 of the flange 20. The height of the side walls 14 and 16 may be less than or equal to the anticipated height of the side rail with respect to the floor of the bed. The specific height may even be greater than this distance depending upon the height of the lip 21 and the angle that the flange 20 makes with the side walls 14, 16. Side wall 16 is positioned adjacent the downwardly extending portion 32 of the rail and the bottom wall 12 of the liner engages the bottom wall 26 of the bed.

The angle that flange 20 forms with the side walls 14 and 16 is an acute angle or less than 90°. This angle in combination with the lip 21 assures that the bottom of the side walls 14, 16 and adjacent portions of the liner bottom wall 12 are displaced from the bottom wall of the bed 26. This allows for the side wall and bottom wall to expand for increasing temperatures and fill the gap between the bottom of the side wall and the bottom wall of the truck 26. The extended condition is illustrated as phantom view A in FIG. 4. If the temperature is cool such that the bottom of the side wall is displaced relative to the bottom wall of the bed, and a heavy load is placed on the bottom wall 12 of the liner, the bottom wall 12 of the liner will deflect downward causing an inward deflection of the side wall 14, 16. This is illustrated in phantom view B in FIG. 4. Thus the stress from changes of temperature or load are dissipated or accommodated by the spacing of the side wall and adjacent portions of the bottom wall of the liner with respect to the bottom wall of the bed.

Figure 1:
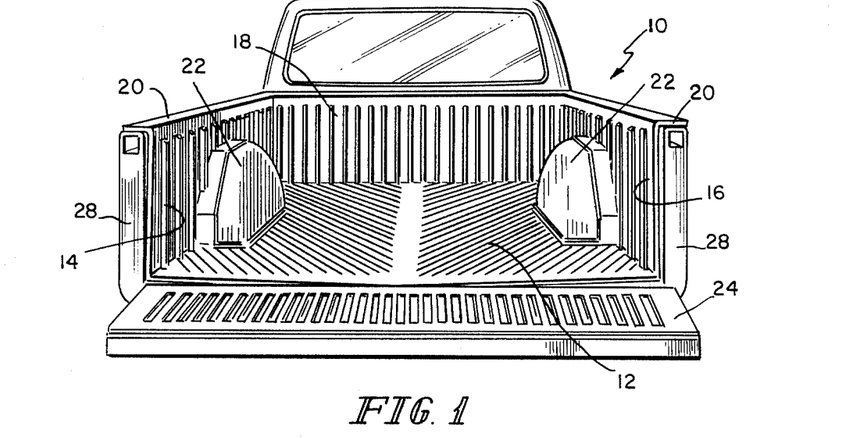
FIG. 1 is a prospective view of a liner according to the principles of the present invention installed in a truck.
Figure 2:
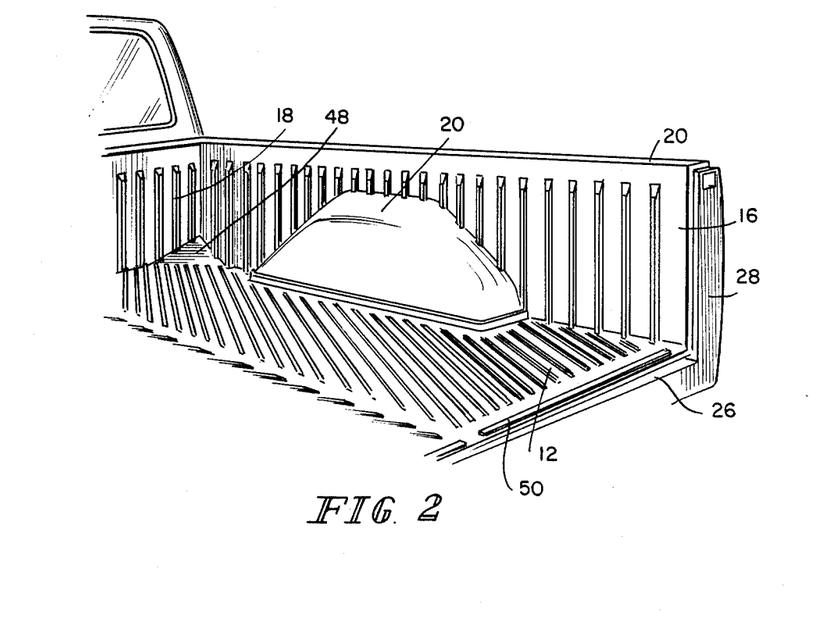
FIG. 2 is a partial prospective view of liner 1 illustrating the intersection of the front, side and bottom walls.
Figure 3:
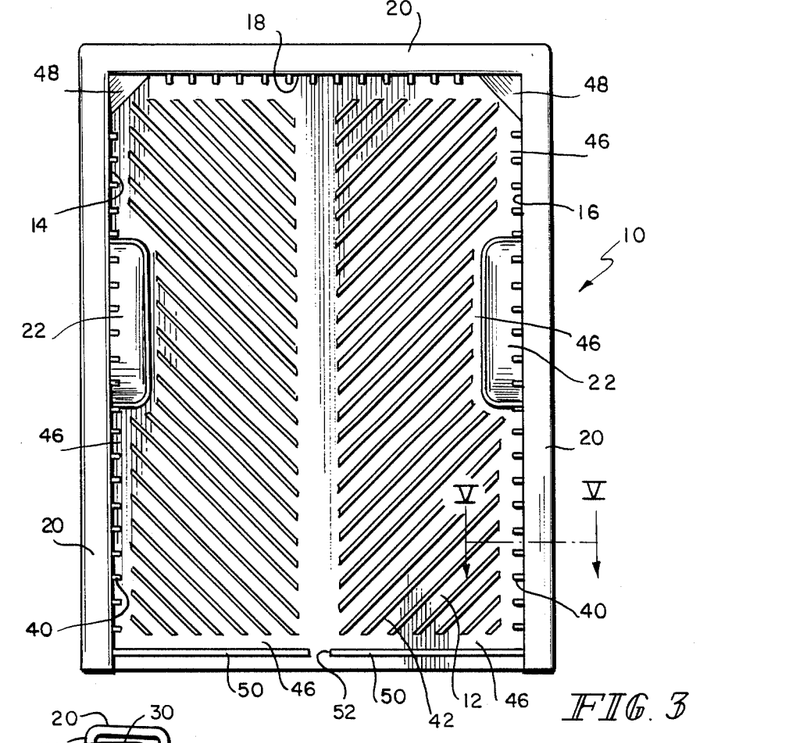
FIG. 3 is a plan view of the liner of FIG. 1 with the truck removed for sake of clarity and without the tailgate portion.

The side walls 14 and 16 and the front wall 18 of the liner include vertical ribs 40 thereon. These ribs provide rigidity to the side and front walls. The height of the wall ribs 40 at the area forward of the wheel well portions 22 are at a reduced height with respect to the wall ribs 40 rearward. This height differential provides increased vertical rigidity to the side walls 16, 14 when the liner 10 is free-standing. The bottom wall 12 of the liner includes raised ribs 42 in a herringbone pattern having two sets of parallel ribs extending at opposite acute angles with respect to the longitudinal axis of the bottom wall. The two sets of ribs are separated from each other to form a center drain 44 and are separated from the side walls 14 and 16, front wall 18 and wheel wells 22 to form periphery drain 46. As illustrated in FIGS. 2 and 3, the bottom wall includes an inclined portion 48, inclined with respect to the liner side walls 14 and 16, front wall 18 and bottom wall 12 at the corners defined by the side walls 14, 16 and front wall 18. The inclined portion 48 prevents water from collecting in the corners and directs it into the periphery drain 46. As is noted, the drain extends around the wheel well 22 and thus the wheel well does not become another source of collection of water or other foreign materials. As illustrated in FIGS. 3 and 5 a raised transverse rib 50 extends between the liner sidewalls 14 and 16, adjacent the back of the liner, and is spaced from the ribs 42 to form a drain 46 therebetween. A center opening 52 is provided in the transverse rib 50 at the longitudinal center line of the liner bottom wall to define an outlet of the drains 44 and 46. The transverse rib 50 is provided as a stiffening member preventing a rippling effect of the bottom wall 12 at the area of the transverse rib 50 resulting from changes in temperature.

Figure 6:
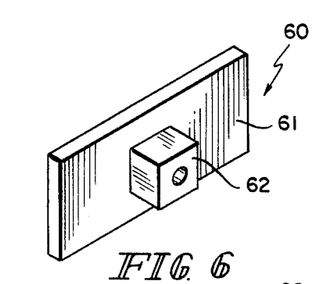
FIG. 6 is an enlarged prospective view which shows the handle member and blocking device of the mounting device of FIG. 5.

A mounting device 60, as illustrated in FIGS. 5 and 6, includes a handle 61 and a blocking device 62 extending from the handle 61. A slot 65 is provided longitudinally through the liner side wall 16, 14. The width and height of the blocking device 62 is less than the width and height of the slot 65. The width and height of the handle 61 is greater than the width and height of the slot 65 to cover it. This prevents foreign material and water from getting behind the liner and protects the slot 65 from damage. The handle 61 and blocking device 62 are formed to threadably receive a fastener 64. The fastener 64 is a self-tapping screw. The blocking device 62 is inserted through the slot 65 disposed against the side wall rail 32 and disposed against the bottom of the slot 65. This allows the liner to shift vertically downward and horizontally in response to load and temperature changes while preventing vertically upward motion in an unloaded condition. This reduces a substantial amount of stress on the side wall of the liner at the fastener. Because the blocking device 62 extends between the handle 61 and the side wall rail 32 when fastened, horizontal movement of the side wall liner 16, 14 perpendicular to the side walls is also permitted which will result from temperature changes as well as loading on the bottom wall 12 of the liner. The mounting device 60 is formed as an integral unit and may be a molded plastic element or extruded metal.

Figure 7:
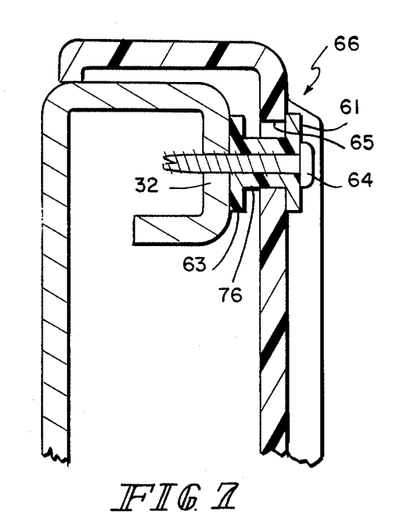
FIG. 7 is a cross-sectional view similar to FIG. 5 which shows a mounting device according to another preferred embodiment of the present invention.
Figure 8:
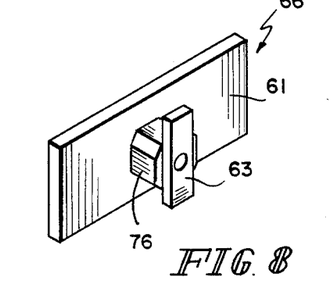
FIG. 8 is an enlarged prospective view which shows the handle member, blocking device and washer of the mounting device of FIG. 7.

Another mounting device 66, as illustrated in FIGS. 7 and 8, includes a handle 61, a blocking device 76 extending from the handle 61, and a washer device 63 extending from the blocking device 62. A slot 65 is provided longitudinally through the liner side wall 16, 14. The blocking device 76 is formed with rounded edges and the height of the blocking device 76 is less than the height of the slot 65. The width of the washer 63 is less than the width of the slot 65 and its length is greater than the width of the slot. The handle 61, blocking device 76, and washer 63 are formed to threadably receive a fastener 64. The fastener 64 is a self-tapping screw. The blocking device is inserted through the slot with the washer device 63 disposing horizontal and then the mounting device 66 is rotated 90° disposing the washer device 63 vertical and against the side wall rail 32 and with the blocking device against the bottom of the slot 65. This allows the liner to shift vertically downward and horizontally in response to load and temperature changes while preventing vertically upward motion. This reduces a substantial amount of stress on the side wall of the liner 16, 14 at the fastener 64. This further reduces the amount of friction at the area of the disposition of the washer device 63 against the side wall rail 32 reducing a marring of the surface of the side wall rail 32 at the fastener by the liner. Because the blocking device 76 extends between the handle 61 and the side rail 32 when fastened, horizontal movement of the side wall liner 16, 14 perpendicular to the side walls is also permitted which will result from temperature changes as well as loading on the bottom wall 12 of the liner. The mounting device 66 is formed as an integral unit and may be a molded plastic element or extruded metal.

Figure 9:
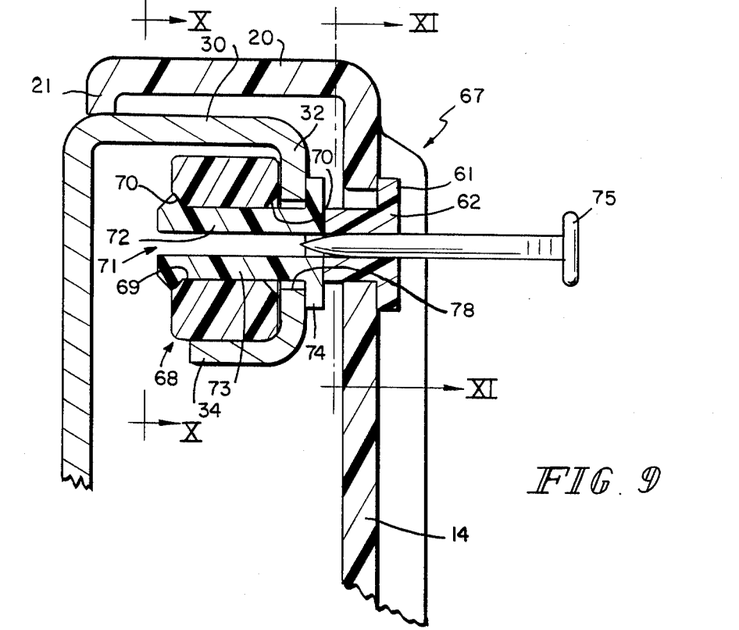
FIG. 9 is an enlarged cross-sectional view similar to FIG. 5 which shows a mounting device according to still another preferred embodiment of the present invention.
Figure 10:
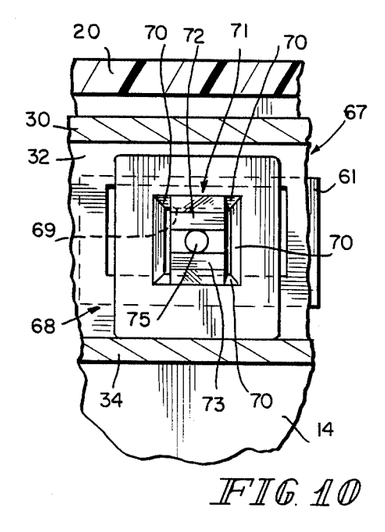
FIG. 10 is a cross-sectional view taken along lines X—X of FIG. 9.
Figure 11:
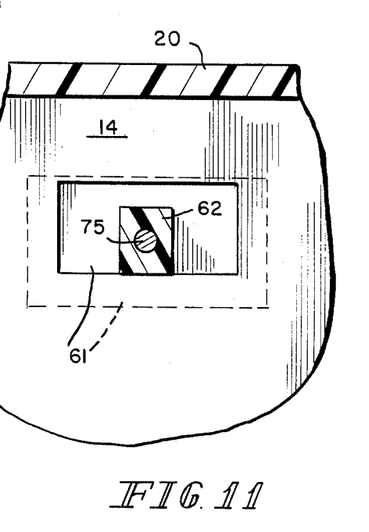
FIG. 11 is a cross-sectional view taken along lines XI—XI of FIG. 9.

Still another mounting device 67, as illustrated in FIGS. 9, 10 and 11, includes a handle member 61 having a blocking device 62 (same as FIG. 5, 6), a swiveling device 71 having a base 74 and having a first and second prong 72, 73 extending perpendicular from the base 74 and locking device 68. The width and height of the blocking device 62 is less than the width and height of the liner slot 65 as illustrated in FIG. 11. The first prong 72 is arranged in vertical alignment over the second prong 73 and the width of gap therebetween is less than the diameter of a bore provided through the base 74 for receiving a fastener 75. The base 74 is arranged outside the downwardly extending side rail 32 and the prongs 72, 73 extend through a longitudinal slot 78 in the side wall rail 32. The base also serves the same function as washer 63 of FIG. 8 to protect the rail wall 32 from the liner. The prongs 72, 73 are rectangular in cross-sectioned and are received in a rectangular opening 69 in the locking device 68 as illustrated in FIG. 10. The entrance and the exit of the opening 69 are chamfered at edges 70 and cooperate with the double-chamfered ends of prongs 72, 73 so as to act as cams during insertion and removal of the prong 72, 73 from the opening 69 in the locking device 68. The locking device 68 is on the inside of the side rail 30, 32 wherein it receives the prongs 72, 73 and by engaging the top portion of the truck side wall rail it locks and prevents further rotation of the swiveling device 71 which includes base 74 and prongs 72, 73. It should be noted that the opening 69 in the rotational locking device 68 is off-center relative to its height. This assures that the rotational lock device 68 will prevent rotation of the swivel device 71 for substantially any truck wall side rail independent of the length of the downwardly extending wall 32 and whether or not an outwardly extending lip is provided at the bottom thereof.

The method of assembly includes forming the rectangular slot 78 in the side wall rail 32. The locking device 68 is positioned behind the side wall rail 32 and the prongs 72, 73 are inserted through the opening 78 of the side wall and 69 of the locking device so as to retain the locking device in position by base 74 engaging the outside of the side wall rail 32 and the chamfered ends of prongs 72, 73 on the outer edge of the rotational lock device 68. The liner is then inserted into the bed of the truck. Block device 62 is inserted through slot 65 in the liner engaging base 74 of the swivel device 71.

The fastener 75 is inserted through the handle 61 and blocking device 62 extending through the base 74 engaging the prongs 72, 73 forcing the prongs 72, 73 apart engaging the chamfered surface 70 of locking device 68. A further tightening of the screw imparts the screw rotational force to and swiveling the locking device 80. The length of the lower portion of locking device 68 is greater than the length of the top portion allowing the lower portion to engage the top of side wall rail 32 securing the mounting device 67 and locating the blocking device 62 against the bottom of the liner slot 65. An untightening of the screw allows disengagement of the longer portion of locking device 68 from the top of the side wall rail 32.

Positioning and locking the blocking device 62 at the bottom of liner slot 65 allows the liner 10 to shift vertically downward and horizontally in response to load and temperature changes while limiting the vertically upward motion. This reduces a substantial amount of stress on the side wall of the liner 16, 14 at the fastener. Because the blocking device 62 extends between the handle 61 and the side wall rail 32, horizontal movement perpendicular to the side walls is also permitted which will result from temperature changes as well as loading on the bottom wall of the liner. The handle and blocking device, the swiveling device, and the locking device are formed as individual integral units and may be molded plastic elements or extruded metal.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A unitary liner for use with a bed of a pickup truck having a bottom, two side walls and a front wall, said liner comprising:
    a bottom wall;
    two side walls and a front wall extending up from said liner bottom wall; and
    means for positioning said liner side walls relative to said bed side walls so that the bottom of said liner walls and adjacent substantial portions of said liner bottom wall are displaced from the bed bottom wall, along substantially the length of said side walls.

2. A unitary liner according to claim 1, wherein said positioning means includes a flange extending outwardly from the top of said liner side walls for engaging the top of said bed side walls to position said liner side walls relative to said bed bottom wall.

3. A unitary liner according to claim 2, wherein said flange and liner side walls form an acute angle.

4. A unitary liner according to claim 2, wherein said flange includes a lip extending downwardly for engaging the top of an inwardly extending side rail of said bed side wall.

5. A unitary liner according to claim 2, wherein said liner wall has a height less than a height of the bed side wall.

6. A unitary liner according to claim 1, having corners at the junction of said front and side walls,
    said bottom wall having a substantially planar portion inclined with respect to said liner side, front and bottom walls to prevent water from collecting in said corners.

7. A unitary liner according to claim 6, wherein said liner bottom wall includes a plurality of spaced, raised ribs spaced from said front and side walls to form a peripheral drainage area adjacent said front and side walls.

8. A unitary liner according to claim 7, wherein said liner includes wheel wells at said side and bottom walls and said ribs being spaced from said wheel wells to form a drain therebetween.

9. A unitary liner according to claim 7, wherein said plurality of ribs are in two groups of parallel ribs extending at opposite acute angles with respect to a longitudinal axis of the liner bottom wall, said ribs being spaced from each other at a longitudinal center line of said liner bottom wall to form a center drain therebetween.

10. A unitary liner according to claim 7, including a raised transverse rib extending between said liner side wall adjacent a back of said liner and spaced from said plurality of ribs to form a drain therebetween, an opening in said traverse rib at a longitudinal center line of said liner bottom wall to define an outlet for said drains.

11. A unitary liner according to claim 10, including vertical ribs at the side wall at an area forward of wheel well portions having a height reduced in height with respect to vertical ribs provided on the side wall at an area rearward of the wheel well portions.

12. A unitary liner according to claim 1 wherein said bottom wall includes a plurality of spaced, raised ribs in two groups of parallel ribs extending at opposite acute angles with respect to a longitudinal axis of the liner bottom wall.

13. A device for mounting a liner having a longitudinal slot in its side wall to a truck bed having inwardly and downwardly extending side wall rails, said device comprising:
    a handle means for retaining the liner side wall between the handle means and the side wall rail,
    blocking means extending from the handle means and to be inserted into said slot for displacing the handle means from the rail a greater distance than a thickness of the liner side wall and for blocking the vertical movement in at least an upward direction and allowing horizontal movement of the liner wall,
    said handle means and said blocking means includes means for receiving a fastener to secure them to the side wall rail, without restricting all motion of the liner side wall with respect to said side wall rail.

14. A device according to claim 13, wherein said blocking means has a width and height less than a width and height respectively of the slot of the liner side wall.

15. A device according to claim 14, wherein the blocking means is to be arranged through the slot and disposed against the side wall rail and disposed against a bottom of the slot.

16. A device according to claim 15 including a self-tapping screw for extending through said handle means, blocking means, and the side wall rail.

17. A device according to claim 13 including washer means extending from the blocking means for receiving a fastener and for relieving friction between the liner side wall and the side wall rail.

18. A device according to claim 17, wherein the blocking means includes rounded cross section for rotation of the blocking means within the slot.

19. A device according to claim 18, wherein said washer means has a greater height than a width of said slot and a lesser width than a width of said slot.

* * * * *

UNITED STATES PATENT AND TRADEMARK OFFICE
CERTIFICATE OF CORRECTION

PATENT NO. : 4,750,776

DATED : June 14, 1988

INVENTOR(S) : Jack Barben

It is certified that error appears in the above-identified patent and that said Letters Patent is hereby corrected as shown below:

In Column 4, line 21 of the patent, please start the sentence beginning "FIG. 11 is a ..." as a separate paragraph.

Signed and Sealed this

Seventeenth Day of January, 1989

Attest:

DONALD J. QUIGG

Attesting Officer

Commissioner of Patents and Trademarks